US009575619B2

(12) United States Patent
Perry et al.

(10) Patent No.: US 9,575,619 B2
(45) Date of Patent: Feb. 21, 2017

(54) DATA CAPTURE DESIGN TOOL FOR DESIGNING AND CONFIGURING SYSTEMS WITH ANALOG FRONT ENDS

(71) Applicant: TEXAS INSTRUMENTS INCORPORATED, Dallas, TX (US)

(72) Inventors: Jeffrey R. Perry, Cupertino, CA (US); Wanda C. Garrett, Morgan Hill, CA (US); Shrikrishna Srinivasan, Santa Clara, CA (US); Khanh N. Vo, Milpitas, CA (US); Dien A. Mac, San Jose, CA (US); Phillip L. Gibson, Sunnyvale, CA (US); Charles W. Sins, San Jose, CA (US); Chi P. Le, San Jose, CA (US); Yuye Zhang, Palo Alto, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 619 days.

(21) Appl. No.: 13/745,278

(22) Filed: Jan. 18, 2013

(65) Prior Publication Data

US 2013/0185675 A1    Jul. 18, 2013

Related U.S. Application Data

(60) Provisional application No. 61/587,985, filed on Jan. 18, 2012.

(51) Int. Cl.
*G06F 17/50* (2006.01)
*G06F 3/0481* (2013.01)
*G06F 9/44* (2006.01)
*H04L 27/00* (2006.01)

(52) U.S. Cl.
CPC ............... *G06F 3/0481* (2013.01); *G06F 8/34* (2013.01); *H04L 27/0002* (2013.01)

(58) Field of Classification Search
CPC ....... G06F 3/0481; G06F 8/34; H04L 27/0002
USPC ........................................................ 716/139
See application file for complete search history.

(56) References Cited

U.S. PATENT DOCUMENTS

| | | | |
|---|---|---|---|
| 5,394,346 A * | 2/1995 | Milsom ......................... | 703/14 |
| 6,678,877 B1 | 1/2004 | Perry et al. | |
| 6,877,033 B1 | 4/2005 | Garrett et al. | |
| 6,931,369 B1 | 8/2005 | Perry et al. | |
| 7,441,219 B2 | 10/2008 | Perry et al. | |
| 7,917,485 B1 | 3/2011 | Gibson et al. | |
| 7,966,588 B1 | 6/2011 | Perry et al. | |
| 8,174,330 B2 * | 5/2012 | McCarthy et al. ............. | 331/66 |
| 8,332,789 B2 | 12/2012 | Perry et al. | |
| 8,416,113 B1 * | 4/2013 | Vanitegem et al. .......... | 341/155 |
| 8,639,853 B2 * | 1/2014 | Rathi et al. ...................... | 710/8 |

(Continued)

*Primary Examiner* — Jack Chiang
*Assistant Examiner* — Brandon Bowers
(74) *Attorney, Agent, or Firm* — Andrew Viger; Charles A. Brill; Frank D. Cimino (57) ABSTRACT

A method of configuring a system includes a selectable analog output device and an analog front end (AFE). The method includes selecting, via a graphical user interface (GUI), an analog output device that provides an analog output signal, the selected device having predetermined characteristics. The method further includes selecting an operating condition for the system and a performance criterion for the system. The method also includes providing a configuration value for programming the AFE based on the selected operating condition and performance criterion.

34 Claims, 10 Drawing Sheets

(56) References Cited

U.S. PATENT DOCUMENTS

| | | | |
|---|---|---|---|
| 8,739,109 B2 * | 5/2014 | Shimizu | G06F 17/5063 716/101 |
| 2010/0325599 A1 | 12/2010 | Perry et al. | |
| 2011/0320175 A1 | 12/2011 | Perry et al. | |
| 2011/0320848 A1 | 12/2011 | Perry et al. | |
| 2011/0320998 A1 | 12/2011 | Perry et al. | |

* cited by examiner

Sensor Selection

| DC | RTD | ThermoCouple | Analog | LoadCell | Pressure |

304

Definition: A sensor whose analog voltage output changes with changing temperature.
Advantages: Inexpensive, small, easy.

310  312
SELECT  NEW

| Part Number | Manufacture | Custom | Temperature_Accuracy_(+/°C) | Min_Supply_(V) | Max_Supply_(V) | Quiescent_Current_(uA) | Min_Temp_(°C) |
|---|---|---|---|---|---|---|---|
| LM94022 | Texas Instruments | NO | 1.5 | 1.5 | 5.5 | 5.4 | -50 |

308

300

Cancel

FIG. 8

Custom Sensor

Part Number *
Manufacture
Temperature_Accuracy_(+/-°C)
Min_Supply_(V)
Max_Supply_(V)
Quiescent_Current_(µA)
Min_Temp_(°C)
Max_Temp_(°C)
Single_Supply  Yes ▼
Output_Impedance_(Ohm)

312 — Create Custom Sensor    Cancel

DATA CAPTURE DESIGN TOOL FOR DESIGNING AND CONFIGURING SYSTEMS WITH ANALOG FRONT ENDS

CROSS-REFERENCE TO RELATED APPLICATION

The present application claims priority to U.S. Provisional Patent Application No. 61/587,985, filed on Jan. 18, 2012 titled "Data Capture Design Tool for Designing and Configuring Systems with Integrated Analog Front Ends," which is hereby incorporated herein by reference in its entirety.

BACKGROUND

Analog front end (AFE) circuitry is used to condition (e.g., amplify, filter, etc.) analog signals generated by a data capture device such as a sensor used to monitor environmental conditions such as temperature, pressure, gas concentrations, etc. Such sensors typically generate small voltages or currents. A sensor typically couples to an analog front end that conditions the signals from the sensor as noted above, which are then typically converted to digital form such as by an analog-to-digital converter (ADC) for further digital processing, although for sensing applications where the sensing data bandwidth is far higher than the actual information bandwidth, direct analog-to-information converters (AIC) are being developed. Designing such analog front ends, including analog front ends integrated with an ADC or AIC, is cumbersome and time consuming.

SUMMARY

The various embodiments disclosed herein are directed to an interactive design tool that facilitates the design process for an AFE for one or more of various types of analog output devices (e.g., sensors). For example, some embodiments are directed to a method of configuring a system includes a selectable analog output device and an analog front end (AFE). The method includes selecting, via a graphical user interface (GUI), an analog output device that provides an analog output signal, the selected device having predetermined characteristics. The method further includes selecting an operating condition for the system and a performance criterion for the system. The method also includes providing a configuration value for programming the AFE based on the selected operating condition and performance criterion.

Other embodiments are directed to a non-transitory, computer-readable storage device storing software that, when executed by a processor, causes the processor to perform various operations. For example, the processor may receive input from a graphical user interface (GUI). The received input may indicate a selection of an analog output device that provides an analog output signal to an analog front end (AFE), the selected device having predetermined characteristics. The processor may also receive a selection via the GUI of an operating condition for the analog output device and AFE, and receive a selection of a performance criterion for the analog output device and AFE. The processor also may generate a configuration value for the AFE based on the received selections of the operating condition and performance criterion.

Yet other embodiments are directed to a system, that includes storage containing software and a processor coupled to the storage and configured to execute the software. Upon executing the software, the processor may receive input from a graphical user interface (GUI) that indicate a selection of an analog output device that provides an analog output signal to an analog front end (AFE), the selected device having predetermined characteristics. The processor may also receive a selection of an operating condition for the analog output device and AFE as well as a performance criterion for the analog output device and AFE. The processor may also generate a configuration value for the AFE based on the received selections of the operating condition and performance criterion.

BRIEF DESCRIPTION OF THE DRAWINGS

For a detailed description of exemplary embodiments of the invention, reference will now be made to the accompanying drawings in which.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The embodiments described herein are directed to a tool usable to configure an analog front end (AFE) for one or more analog output devices, which in at least some embodiments includes sensors (e.g., temperature sensors, load cells, pressure sensors, etc.). The description below may refer to sensors specifically, but in general, the tool applies to any type of analog output device. Moreover, the AFE may be integrated with, for example, an ADC for converting analog information into digital data such as for further processing and/or presentation.

The AFE may be programmable via one or more registers. The AFE conditions signals produced by the sensors and provides the conditioned sensor signals, such as for conversion by an ADC for further digital processing by host logic. The AFE is programmable to be coupled to one or more sensors and various types of sensors, and to interface to an ADC or other means of digital conversion (either integrated with or external to the AFE) as well as to operate in accordance with various operating conditions and performance criteria selected by a user of the tool.

The tool described herein permits a user to select one or more sensors and one or more performance criteria and operating conditions for the sensor-AFE combination and the tool will determine one or more configuration values for configuring registers of the AFE. Further, the tool can be used to actually load the determined configuration values into the AFE.

Figure 1:
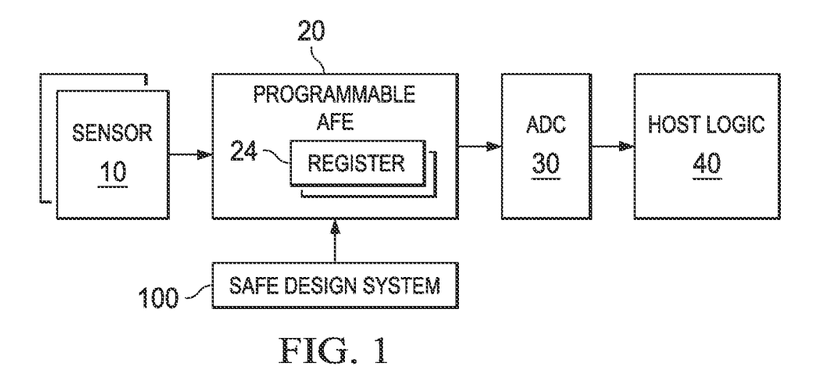
FIG. 1 shows a block diagram of an illustrative sensor analog front end (SAFE) system including one or more sensors, a programmable analog front end and a sensor analog front end design system.

FIG. 1 shows an implementation in which one or more sensors 10 couple to a programmable AFE 20 which includes one or more user-readable and writeable registers 24. The AFE 20 may provide amplification, filtering and other signal processing functions. The AFE 20 may be associated with an analog-to-digital converter (ADC) 30. In some implementations, the ADC 30 is separate from the AFE 20, but alternatively may be integrated into the AFE. The conditioned and digitized sensor signals from the AFE/ADC are provided to host logic 40, which processes the sensor signals as desired. For example, the host logic 40 may comprise an embedded controller for a system such as a medical device, an antilock brake system for an automobile, etc.

FIG. 1 also shows a sensor AFE (SAFE) design system (tool) 100 which, as explained below, permits a user to configure the AFE 20 in an interactive fashion. The SAFE design system 100 determines the values to be loaded into the AFE's various registers 24 based on one or more operating conditions and performance criteria selected by a user. The various user-selectable operating conditions and performance criteria and how the SAFE design system 100 permits their selection by a user is explained below.

Figure 2:
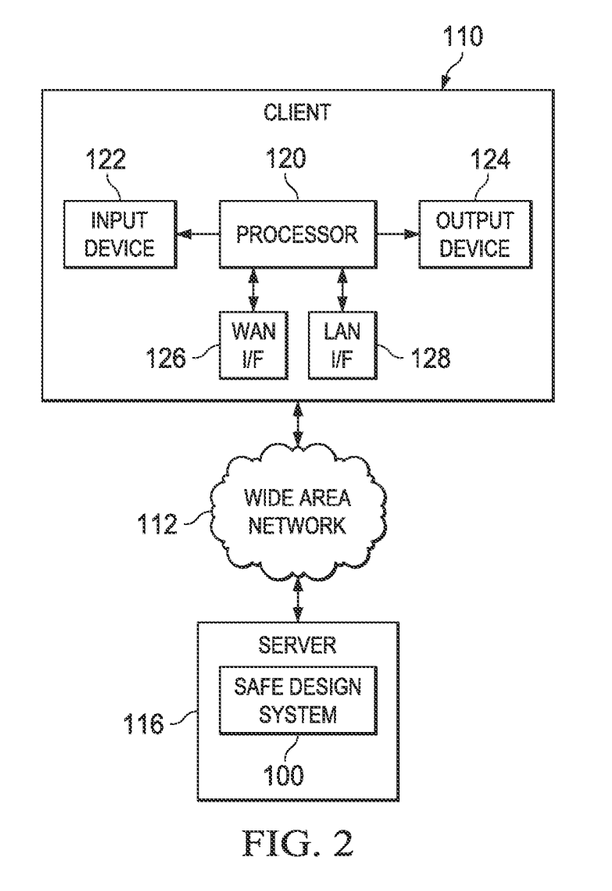
FIG. 2 shows another illustrative implementation of a SAFE system in accordance with the preferred embodiments.

In some implementations, the SAFE design system 100 is implemented as a web-based tool accessible by a user over a wide area network (e.g., the Internet). FIG. 2 shows an example of a client 110 operatively coupled to a server 116 through a wide area network 112. The client includes a processor 120 coupled to an input device 122, an output device 124, a wide area network (WAN) interface 126, and a local area network (LAN) interface 128. The processor 120 receives input from a user via the input device (e.g., keyboard, mouse, track pad, etc.) and displays information to the user via the output device 124 (e.g., a display). The LAN interface 128 (e.g., USB, Ethernet, etc.) may be used to connect the client 110 to the programmable AFE 20.

Through the LAN interface 128, the client may provide configuration values to registers internal to the AFE 20 to thereby configure the AFE. The WAN interface 126 provides the client 110 connectivity to the server 116 through the WAN 112 (e.g., the Internet).

The SAFE design system 100 may be implemented on server 116, and its implementation is described in greater detail below. In some implementations, the SAFE design 100 is accessible to a user of client 110 via a web-based interface through a browser running on the client 110. In other implementations, the SAFE design system 100 may be implemented on client 110 and not operated over the wide area network 112.

Figure 3:
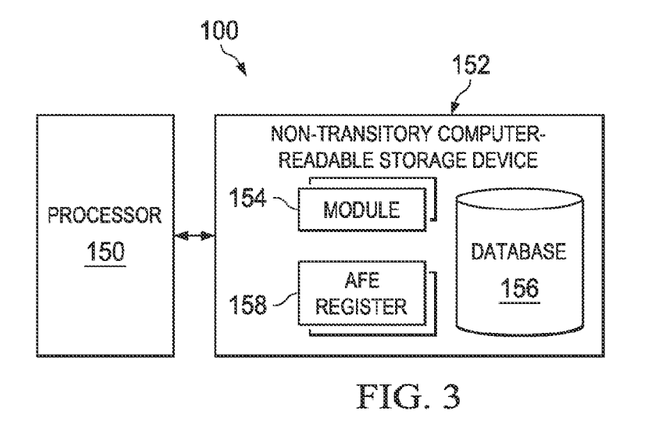
FIG. 3 shows an implementation of a server in accordance with the preferred embodiments.

FIG. 3 shows an embodiment of the SAFE design system 100. In the embodiment shown, the SAFE design system 100 includes a processor 150 coupled to a non-transitory, computer-readable storage device 152. Although a single processor 150 is shown in FIG. 3, in other implementations, multiple processors are included.

The storage device 152 may comprise volatile storage (e.g., random access memory), non-volatile storage (e.g., hard disk, optical disc, Flash storage, etc.), or combinations of both volatile and non-volatile storage. The storage device 152 stores one or more modules 154. Each module 154 preferably includes code that is executable by processor 150. In some embodiments, the processor 150 executing the module(s) 154 provides the SAFE design system 100 with at least some of the functionality described herein.

The storage device 152 also includes a database 156 in which sensor device information is stored. Such information may include predetermined electrical characteristics and device manufacturing-type information of the various analog output devices (e.g. sensors). Examples of such predetermined electrical characteristics include sensitivity, non-linearity, full scale output, span tolerance, etc. Examples of such manufacturing-type information include the part number, manufacturer, etc. The storage device preferably also stores AFE register values 158. The AFE register values are determined by the SAFE design system based on the user-selected operating conditions and performance criteria. The AFE register values may be viewed on the output device 124 of client 110 and/or written to hardware registers 24 internal to the programmable AFE 20.

Figure 4:
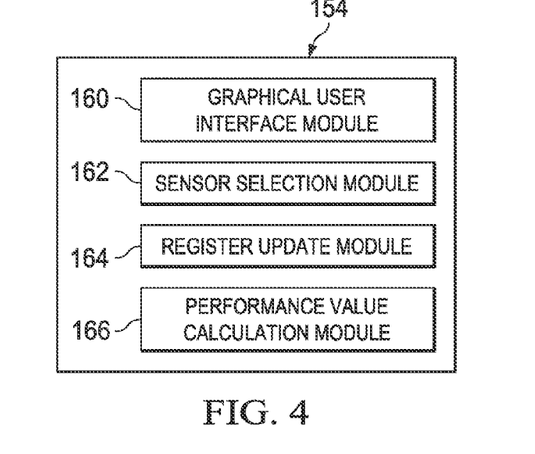
FIG. 4 illustrates various modules usable in accordance with the preferred SAFE system.

FIG. 4 shows an illustrative set of executable software modules 154. The modules 154 may include a graphical user interface (GUI) module 160, a sensor selection module 162, a register update module 164, and a performance value calculation module 166. Although four separate modules are shown in FIG. 4, in other embodiments, the functionality implemented by the modules may be implemented by a different number of modules. For example, fewer than four modules (e.g., a single executable module may be used to implement the functionality of modules 154.

Figure 5:
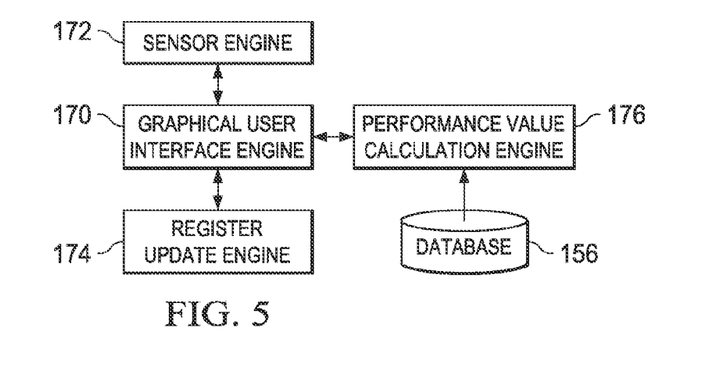
FIG. 5 shows yet another implementation of a SAFE system.

FIG. 5 illustrates another implementation of the SAFE design system 100 in the form of various engines 170-176: a GUI engine 170, a sensor engine 172, a register update engine 174, and a performance value calculation engine 176. Functionally, each engine 170-176 corresponds to the similarly-named executable module 160-166 of FIG. 4. Each engine 170-176 is implemented as the processor 150 executing a corresponding module 160-166. For example, the sensor engine 172 is implemented as processor 150 executing the sensor module 162. The functionality performed by the SAFE design system 100 may be performed largely by the various engines 170-176.

In general, the GUI engine 170 generates the graphical user interface for presentation on the client's output device 124 and receives input from a user (e.g., a selection in a drop down menu, typed input, etc.). The sensor engine 172 is responsible for accessing database 156 to present sensor choices to a user and to access sensor-specific information from the database regarding whichever sensor(s) the user has selected. The register update engine 174 determines AFE configuration values based on the user's selection of various operating conditions and performance criteria and stores the configuration values in AFE register storage 158. The register update engine 174 may also write configuration values from the register storage 158 to actual registers internal to an AFE that may be connected to the client 110. The performance value calculation engine 176 computes performance values applicable to the performance of the combination of the sensor(s) 10 and AFE 20 based on the sensors selected and the various performance criteria and operating conditions selected by the user of the system 100. The performance value calculation engine 176 preferably retrieves sensor-specific electrical information from the database 156 as needed to make its computations.

The SAFE design system 100 is useful to configure a programmable AFE for use with various types of analog output devices. One example of an analog output device is a sensor, but as noted above the system can be used with other types of analog output device and, in general, any type of analog output device that provides an analog output signal and has various predetermined characteristics. By way of example, the description herein is presented in terms of "sensors," the tool is applicable to other types of devices as well.

The database 156 stores information about multiple sensors such as the predetermined characteristics and a digital representation of a graphical depiction of each such sensor, electrical properties of each such sensor, the manufacturer of the sensors, part numbers, etc. The system 100 also permits the user to define a new type of sensor, whose information can be added to database 156.

Figure 6:
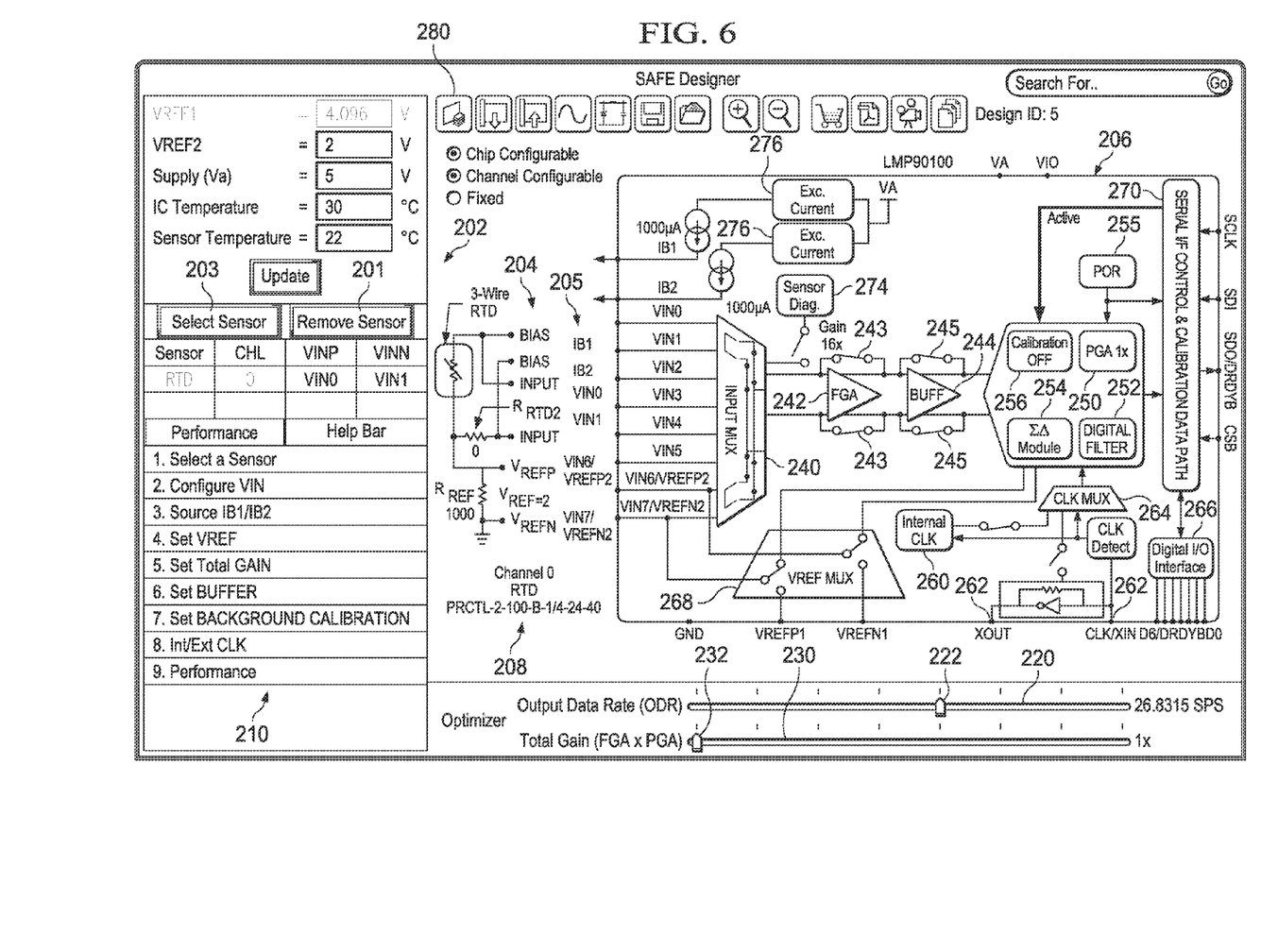
FIG. 6 illustrates a graphical user interface (GUI) for designing and configuring a SAFE.

When a user starts the SAFE design system 100 (e.g., by using a browser on client 110 to access the SAFE design system 100 on server 116), a GUI such as that shown in FIG. 6 is displayed on the client's output device 124. The GUI presented to the user is generated by the GUI engine 170. The GUI of FIG. 6 includes various portions. All references to a user "clicking" something on the GUI includes any type of user input activation such as clicking a button on a mouse, touching a touch sensitive display, etc.

Figure 7:
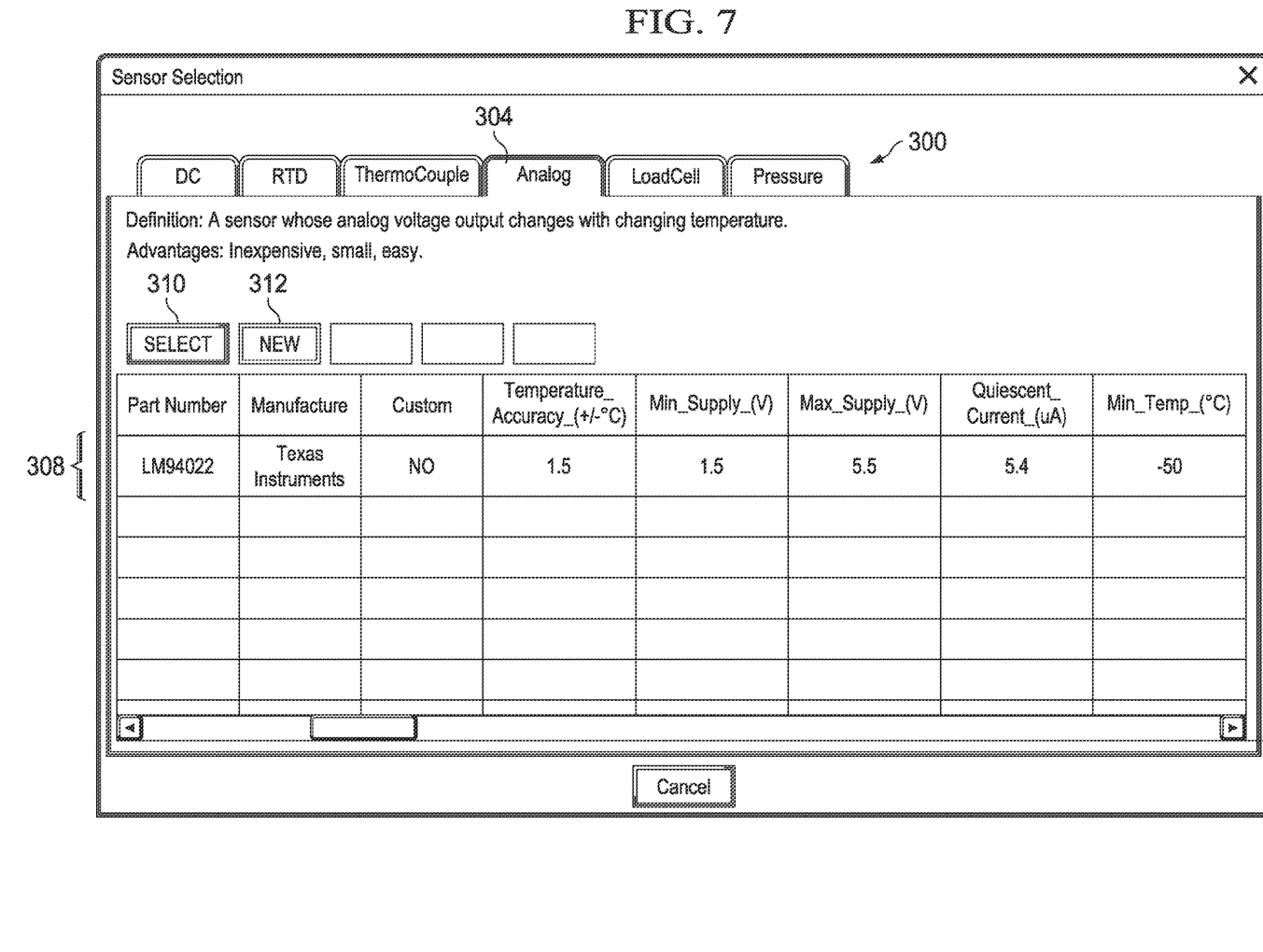
FIG. 7 shows a GUI for selecting analog output device in accordance with the preferred embodiments.
Figure 8:
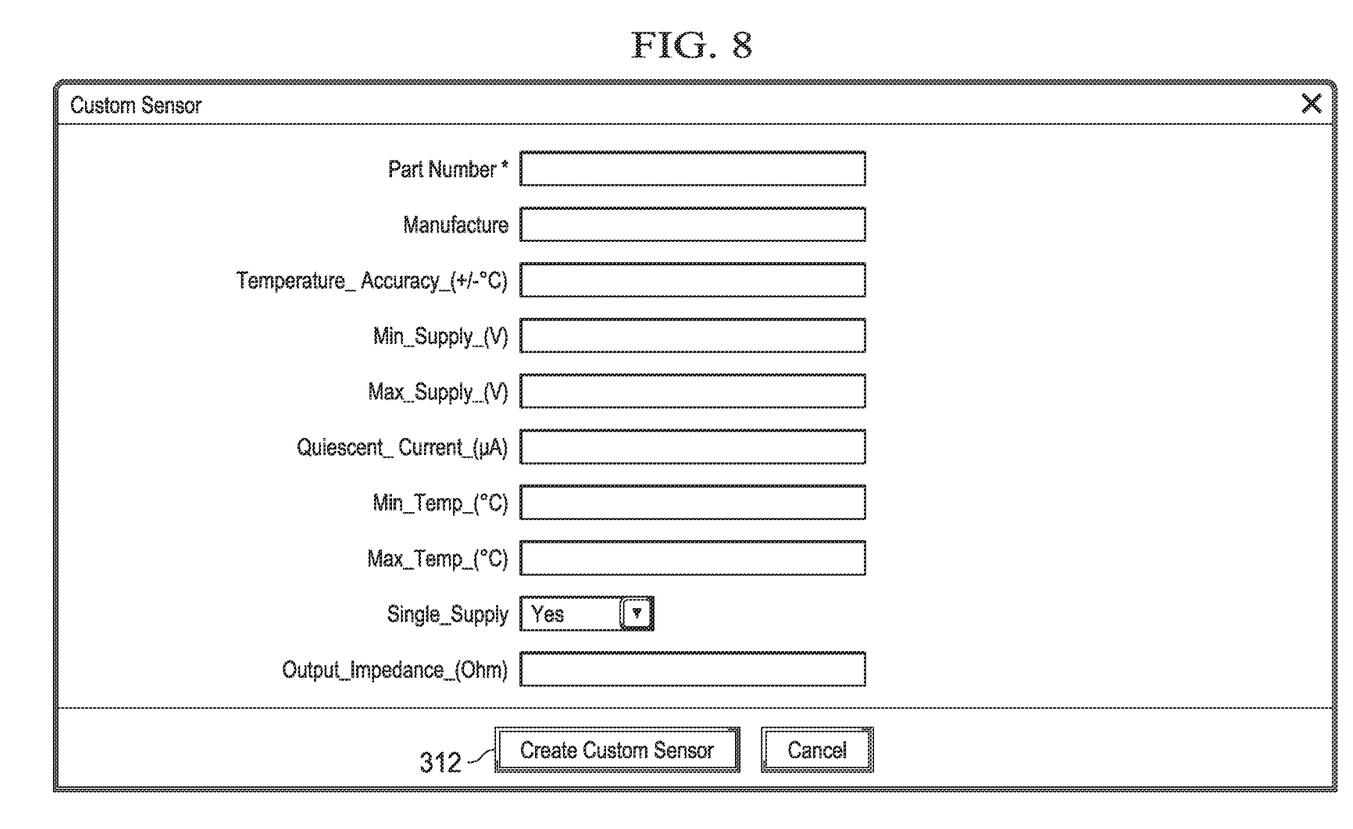
FIG. 8 shows a GUI for a user to create a custom analog output device in accordance with the preferred embodiments.

The left-hand side of the GUI includes a portion 202 which includes a table in which all user-selected sensors are listed. In the example of FIG. 6, the user has already selected a resistance temperature detector (RTD). The sensor engine 172 performs the function of enabling a user to select a sensor. The specific RTD selected by the user is from a certain manufacturer and has a certain part number. A graphical depiction of the selected sensor is shown at 204. The part number of the sensor is shown at portion 208 just below the sensor's graphical depiction 204. Additional sensors can be added by a user by clicking the button 203 ("Select Sensor"). Once a user clicks that button, a dialog box opens as shown in FIG. 7. The dialog box includes various types of user-selectable sensor types 300 across the top. The "Analog" type 304 has been selected and a listing of the various sensors in database 156 corresponding to the selected sensor type 300 is shown as well. In this example, only a single sensor 308 is included in the database 156 corresponding to the Analog type 304. The user can click on whichever sensor is desired and the click the "Select" button 310, or click the "New" button 312 to manually define a new sensor in which case a dialog box such as that of FIG. 8 is presented to the user. The user fills in the requested sensor part information and clicks the "Create Custom Sensor" button 312 to add the sensor's information to the database 156. In FIG. 6, the "remove sensor" button 201 permits a user to remove a sensor from the table that had previously been selected.

Referring to FIG. 6, a schematic representation of the programmable AFE is shown at 206. The AFE graphic includes:

an input multiplexer (MUX) 240
a fixed gain amplifier (FGA) 242
a buffer 244
a programmable gain amplifier (PGA) 250
a digital filter 252
a delta-sigma modulator 254
a calibration unit 256
an internal clock 260, pins 262 through which an external clock can be provided, and a clock MUX 264
a digital interface 266
a reference voltage MUX (VREF MUX) 268 which selects, as a reference voltage, a voltage from pins VREFP1/VREFN1 or from pins VREFP2/VREFN2
a serial interface control and calibration data path 270
sensor diagnostics 274
programmable excitation current sources 276

Some of the constituent elements of the AFE are fixed and not configurable, while other AFE elements are configurable by way of internal registers. In the example of FIG. 6, the non-configurable elements include the digital filter 252, the delta-sigma modulator 254, the internal clock 260, and the serial interface control and calibration data path 270. Many or all of the remaining elements are configurable to some degree as explained below.

The GUI of FIG. 6 also includes a pair of sliders 220 and 230 at the bottom. Slider 220 is user-selectable to control the output data rate (in samples per second). The current setting for the data rate in FIG. 6 is set at 26.8315 samples per second. Slider 230 is user selectable to control the total system gain. The gain of the system is a function of the gain programmed for the PGA 250. The PGA 250 in the example of FIG. 6 has programmable gain settings of 1, 2, 4, and 8. The FGA 242 has a fixed gain of 16. The FGA 242 can be enabled or disabled. If the FGA 242 is enabled, then the total system gain is a product of the FGA's gain (16) and the gain programmed into the PGA 250 (1, 2, 4 or 8). In the example of FIG. 6, the user has moved the slide indicator 232 slider 230 all the way to left for a total system gain setting of 1. The GUI engine 170 updates the AFE graphic to show that the PGA 250 has been programmed for a gain setting of 1 as indicated by the "1×" displayed just below "PGA." Further, the GUI engine 170 has visually indicated that the FGA has been disabled by the bypass indicators 243 in the closed/bypass orientation indicating the FGA 242 has been bypassed and thus disabled.

Figure 9:
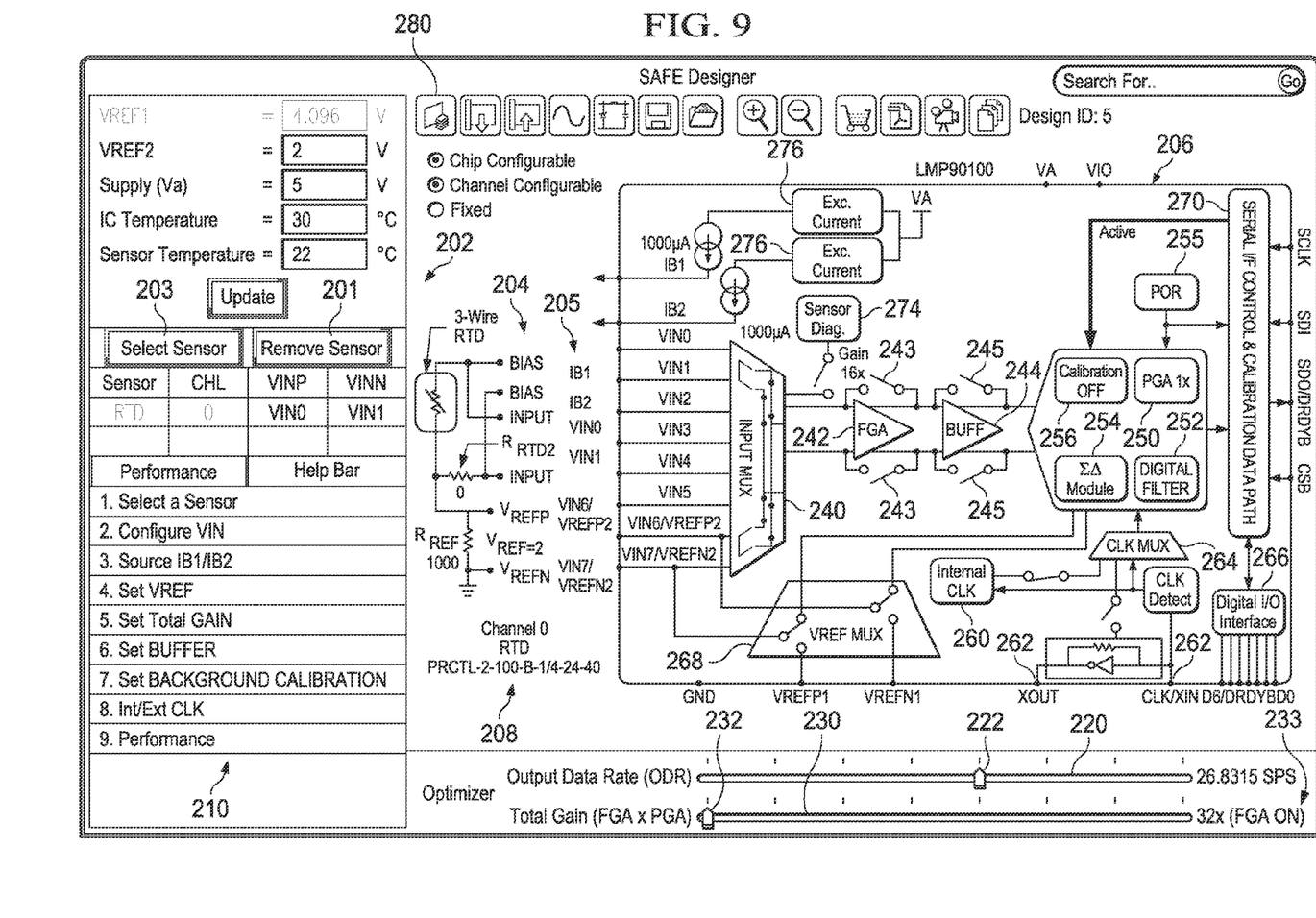
FIG. 9 shows another depiction of the GUI of FIG. 7 in accordance with the preferred embodiments.

In the example of FIG. 9, the user has moved the total gain slide indicator 232 to a setting of 32. For a gain setting of 32, the PGA 250 is programmed to a gain setting of 2 and the FGA 242 (with its fixed gain of 16) is enabled. At 233, the GUI has indicated that the gain setting is 32. The FGA 242 is now enabled, which is depicted by the GUI re-orienting the bypass indicators 243 to their open position as shown.

The AFE 20 preferably includes a gain register into which a value can be written to program the system gain. In some implementations, the gain settings for the gain register are 1, 2, 4, 8, and 16. The user manually moving the slide indicator 232 causes the update register engine 174 to automatically write a new value to the gain register. Writing a particular value to the gain register causes the AFE to enable or disable the FGA 242 and program the PGA 250 accordingly.

Figure 10:
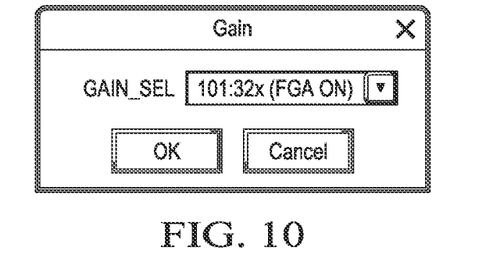
FIG. 10 shows a GUI for configuring a gain register in accordance with the preferred embodiments.

Referring back to FIG. 6, the user can click on either the FGA 242 or the PGA 250 to be permitted access to directly change the AFE's gain register. FIG. 10 shows an illustrative dialog box that is displayed by the GUI engine 170 when the user clicks the FGA 242 or the PGA 250. The gain register is shown as GAIN_SEL. A drop down menu can be selected to provide a list of all possible gain settings for the register. The user can then click OK to cause the update register engine 174 to accept the selected gain value and program the register 158 accordingly.

The user can thus configure the AFE for a particular gain setting multiple ways—by moving the total gain slider 232 or by clicking one of the amplifiers to directly update the gain register. If the user directly updates the gain register, any change to the gain register value will cause the GUI engine 170 to automatically move the total gain slider 232 to the position corresponding to the new gain register value.

For the particular sensor selected, the graphical depiction of the sensor at 204 shows the various pins applicable to that particular sensor. In the RTD example of FIG. 6, the sensor pins include 2 BIAS pins, 2 input pins, and 2 reference voltage pins. At 205, the GUI shows how the sensor's pins are to be connected to the AFE. As shown, the bias pins are connected to the IB1 and IB2 bias pins, the input pins are to be connected to the VIN0 and VIN1 input pins of the input MUX 240, and the reference voltage pins are connected to the VIN6/REFP2 and VIN7/VREFN2 pins of the input MUX 240.

Figure 11:
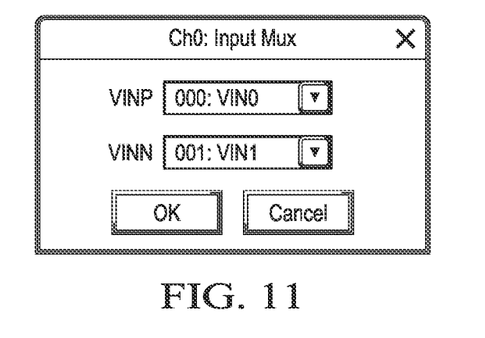
FIG. 11 shows a GUI for configuring an input multiplexer register in accordance with the preferred embodiments.

The input MUX 240 is also configurable by the user clocking on the input MUX 240 to be presented with a dialog box for configuring the input MUX. The user can, for example, configure the polarity of the various pins. FIG. 11 shows an illustrative dialog box that the GUI engine 170 causes to be displayed. The dialog box provides two drop down menus that permit a user to select one or more of the inputs (e.g., VIN0-VIN4) to be either a positive polarity (VINP) or a negative polarity (VINN).

Figure 12:
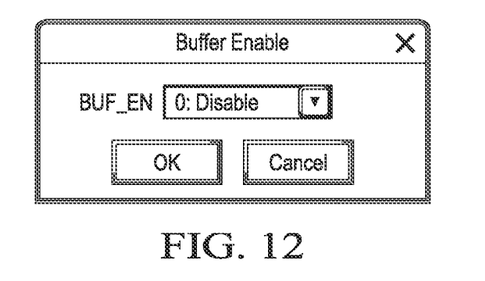
FIG. 12 shows a GUI for configuring a buffer register in accordance with the preferred embodiments.

The buffer 244 of FIG. 6 is also configurable. The buffer provides a high impedance input. By clicking on the buffer 244, a dialog box as illustrated in FIG. 12 is displayed to permit a user to write to a BUF_EN register (via the register update engine 174) to thereby selectively enable and disable the buffer. Enabling the buffer includes the buffer in the signal path and disabling the buffer excludes the buffer from the signal path. When the total gain is set to a level of 16 or higher, the buffer 244 is automatically enabled regardless of the setting BUF_EN register. The buffer 244 is visually depicted by the GUI engine 170 as being enabled or disabled by the bypass indicators 245. In FIG. 6, buffer 244 is disabled as indicated by the bypass indicators 245 in the closed position, while in FIG. 9, the buffer 244 has been enabled as indicated by the indicators 245 in the open position. The total gain has been set to a level of 32 in FIG. 9, and thus the buffer 244 is automatically enabled and indicated as such by the GUI engine 170.

Figure 13:
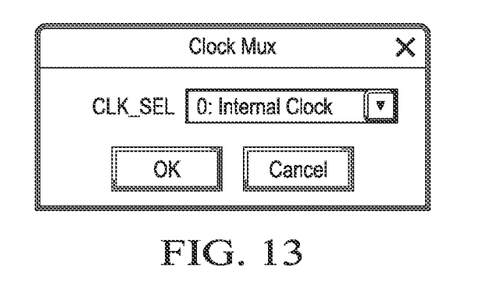
FIG. 13 shows a GUI for configuring a clock multiplexer register in accordance with the preferred embodiments.

The clock MUX (CLK MUX) 264 is configurable as well by a user to permit selection of either an internal clock 260 or an external clock provided to the AFE via the XIN and XOUT pins 262. The user can configure the CLK MUX 264 by clicking on CLK MUX 264 which causes the GUI engine 170 to render a dialog box as illustrated in FIG. 13. The dialog box shows a CLK_SEL register along with a drop down menu to permit a user to select either the internal clock or the external clock.

Figure 14:
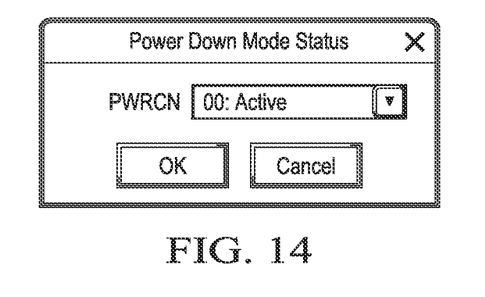
FIG. 14 shows a GUI for configuring a power mode register in accordance with the preferred embodiments.

The power mode for the AFE can be configured by clicking on power on reset (POR) 255 (FIG. 6). The power modes can be any desired modes such as Active, Standby and Shutdown. In the Active mode, the AFE is fully operational. In the Standby mode, the AFE does not convert data, contents of the registers are unaffected and the analog supply current drops to a reduced level which allows the device to quickly transition into the active state if desired, while in the Shutdown mode, the AFE does not convert data, contents of the registers are unaffected and the analog supply current drops to a minimal level which takes longer to transition into the active state if desired. Upon clicking on the POR 255, a dialog box such as that shown in FIG. 14 is displayed by the GUI engine 170. The user can then select a power mode from a drop down menu of choices and the register update engine 174 updates the corresponding register (PWRCN).

Figure 15:
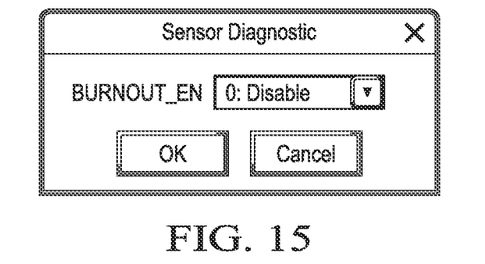
FIG. 15 shows a GUI for configuring a sensor diagnostic register in accordance with the preferred embodiments.

FIG. 15 shows a dialog box that is displayed upon the user clicking on the sensor diagnostics 274. The diagnostics feature of the AFE can be enabled or disabled by the user and the register update engine updates the corresponding register (BURNOUT_EN).

Figure 16:
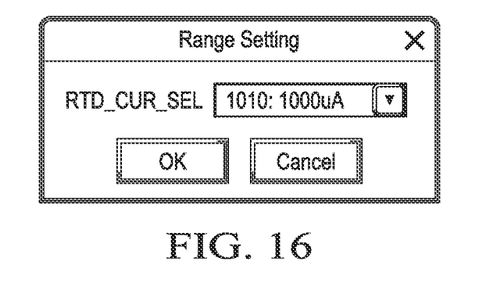
FIG. 16 shows a GUI for configuring an excitation current amplitude register in accordance with the preferred embodiments.

At least some sensors require an excitation current. The AFE provides programmable excitation current sources 276. FIG. 16 shows a dialog box that is displayed upon the user clicking on the excitation current representation 274. The GUI engine 170 permits the user to select an excitation current from a drop down menu to configure the RTD_CUR_SEL register. In some implementations, the choices of excitation current is from 0 to 1000 µA in 100 µA increments (i.e., 0 µA, 100 µA, 200 µA, . . . , 1000 µA).

FIG. 6 also illustrates a digital IC interface 266 which provides various general purpose I/O pins. The use of these pins can be programmed by a user by clicking on the digital IC interface 266 which causes the GUI 170 to display a dialog box (not shown) to permit the user to program a value into a GPIO_DIRx register. The value may specify which GPIO pins are used and whether each such pin is an input pin, an output pin, or a bidirectional pin.

Figure 17:
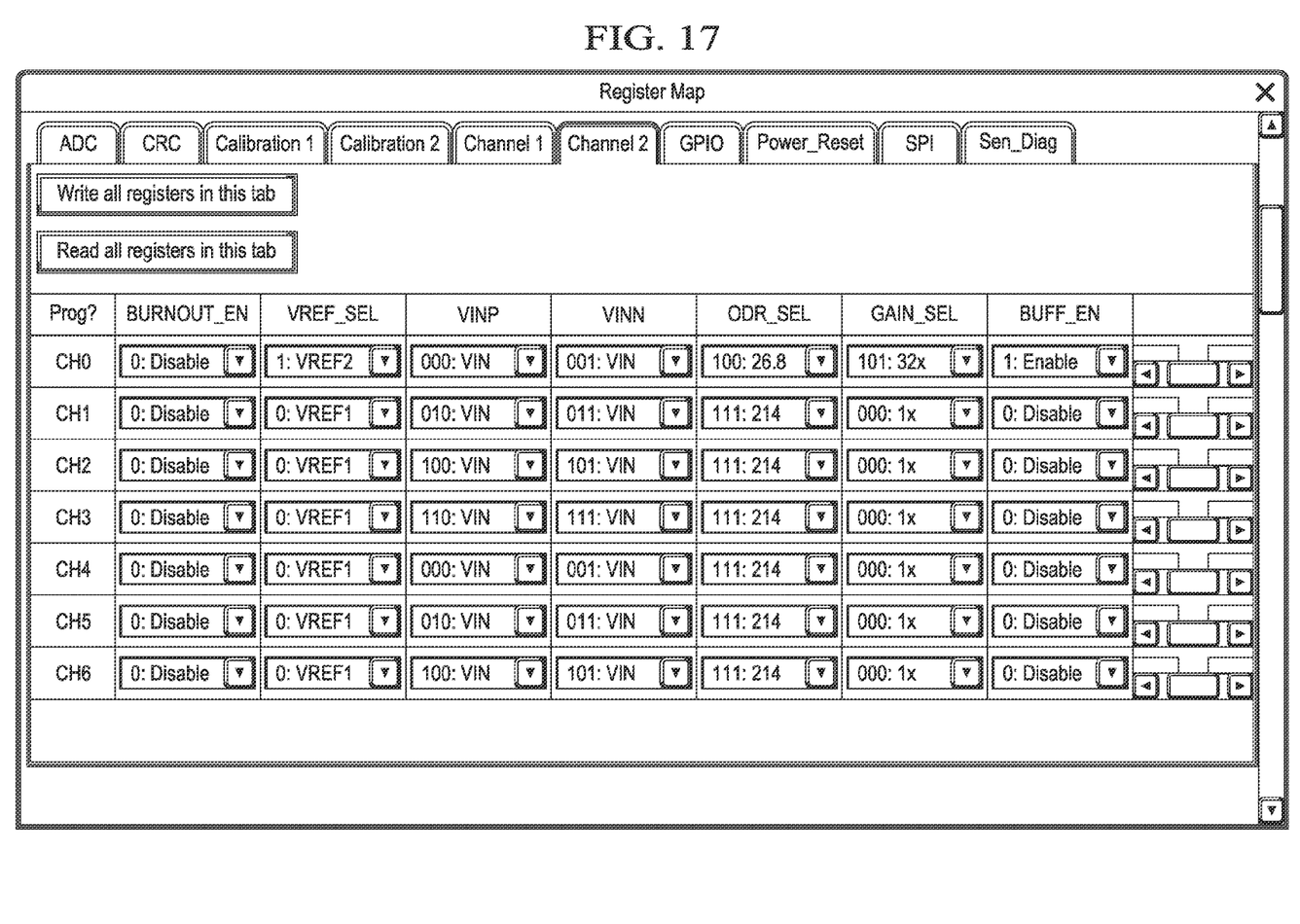
FIG. 17 shows a GUI for configuring the various registers in the AFE via a register map in accordance with the preferred embodiments.

As explained above, the user can configure the various functions of the AFE by clicking on individual functional blocks in the schematic displayed by the GUI engine 170. An alternative option for configuring the AFE is for the user to click on the register map icon 280 near the top of FIG. 6. Upon clicking on the register map icon 280, the GUI engine 170 causes a list of all configurable registers to be displayed as illustrated in FIG. 17. Each sensor is coupled to one of the channels of the AFE and the user can click on a drop down menu adjacent each register for any given channel to reconfigure the value in that register. Upon changing the contents of any register in the register map, the GUI engine 170 automatically modifies the graphical depiction of the AFE in accordance with the changed register value(s).

Referring back to FIG. 6, portion 210 of the GUI includes one or more performance values that are calculated by the performance value calculation engine 176 and displayed on the GUI by the GUI engine 170. As shown in the example of FIG. 6, the performance values include input referred noise, effective number of bits (ENOB), noise free resolution (NFR), current amplitude, and device error at a specific temperature level. Additional or different performance values can be calculated and displayed. The performance value calculation engine 176 retrieves information from the database 156 on the particular sensor being displayed and computes the various performance values based on the configuration settings specified by the user. For example, the ENOB is determined based on sample rate and the total gain (e.g., ENOB=log[(2*vref/gain)/(RMS noise)]/log(2). The NFR may be computed as log[(2*vref/gain)/(peak to peak noise)]/log(2).

Some of the user-selectable features are operating conditions and others are performance criteria. The SAFE design system 100 generates a configuration value for an AFE register based on at least one selected operating condition and/or performance criterion. Of course, the SAFE design system 100 may generate multiple configuration values for the various registers based on multiple selected operating conditions and performance criteria.

An illustrative list of operating conditions may include any one or more of the following:
1. input signal polarity;
2. voltage reference input;
3. selection between internal and external clock;
4. GPIO direction;
5. power mode;
6. calibration mode; and
7. diagnostics mode.

An illustrative list of performance criteria may include any one or more of the following:
1. sample rate;
2. system gain; and
3. excitation current The various operating conditions and performance criteria listed above can be selected and specified by a user via the various GUIs described above.

Figure 18:
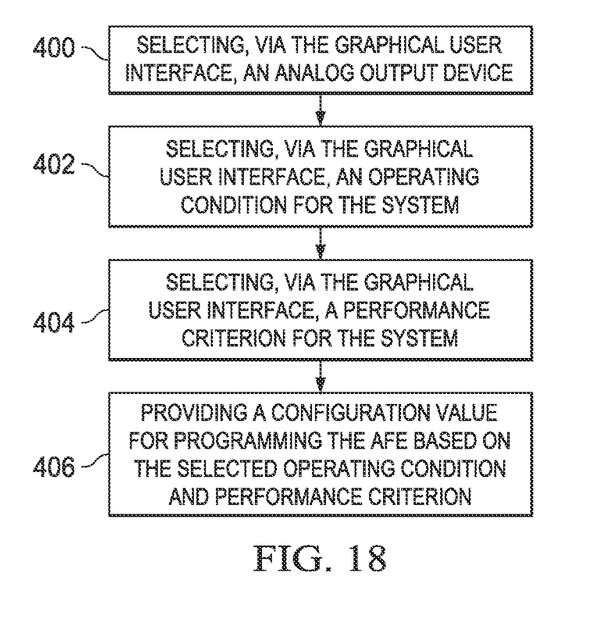
FIG. 18 illustrates a method in accordance with the preferred embodiments.

FIG. 18 illustrates a method in accordance with a preferred embodiment. The operations depicted can be performed in the order shown, or in a different order. Further, two or more of the operations can be performed in parallel.

At 400, a user selects, via the GUI, an analog output device (e.g., a sensor). At 402 and 404, the user selects an operating condition and a performance criterion, respectively. As desired, the user may select multiple operating conditions and/or multiple performance criteria. The selection of operating conditions and performance criteria preferably is implemented by the GUI module.

At 406, the method further comprises providing a configuration value for programming the AFE based on the selected operating condition and performance criterion. Providing the configuration value includes displaying the configuration value on output device 124, saving the configuration value to AFE registers 158 of the non-transitory, computer-readable storage device 152, writing the configuration value to a register internal to the AFE, etc.

After a user starts the SAFE design system 100 in on-line mode (e.g., by using a browser on client 110 to access the SAFE design system 100 on server 116), the user can then select the disk icon (FIG. 6) to initiate a save operation. This causes a file containing the SAFE configuration including register settings, and selected sensor(s) to be saved to the user's local system. The user can then start up a version of the software on the user's local off-line system and click on the load icon to load up the previously saved file. This will cause the saved register settings and selected sensor(s) to be loaded into the off line SAFE GUI. This allows SAFE designs which are created using the on line version to be easily used in the off line version.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of configuring a system including a selectable analog output device and an analog front end (AFE), comprising:
   selecting, via a graphical user interface (GUI), an analog output device that provides an analog output signal according to predetermined characteristics;
   loading into an AFE register internal the AFE an AFE configuration value for configuring the AFE to condition the analog output signal to provide a conditioned analog signal, including
      selecting, via the GUI, an operating condition for the system comprising at least one of: input signal polarity, calibration mode and diagnostics mode;
      selecting, via the GUI, a performance criterion for the system comprising at least one of: sample rate and excitation current;
      generating the AFE configuration value based on the selected operating condition and performance criterion; and
      loading the AFE configuration value into the AFE register.

2. The method of claim 1 wherein selecting the analog output device comprises selecting a sensor.

3. The method of claim 1 wherein selecting the operating condition and performance criterion includes selecting a plurality of operating conditions and a plurality of performance criteria, and wherein providing the configuration value for the AFE includes providing a plurality of configuration values based on the plurality of selected operating conditions and the plurality of selected performance criteria.

4. The method of claim 1 wherein selecting an operating condition further comprises at least one of:
   selecting a voltage reference input;
   selecting between a clock generated internal to the AFE and an external clock; and
   specifying a value for a general purpose input/output (GPIO) direction register;
selecting a power mode.

5. The method of claim 1 wherein selecting a performance criterion further comprises selecting a system gain.

6. The method of claim 1 further comprising generating a schematic depiction of the selected analog output device and AFE based on the selected operating condition and selected performance criterion.

7. The method of claim 6 wherein selecting the performance criterion includes selecting a system gain, and wherein the schematic depiction includes a graphic of a fixed gain amplifier (FGA) and a graphic of programmable gain amplifier (PGA), the FGA graphic visually indicates whether the FGA is enabled or disabled, and the method further comprises changing the FGA graphic from enabled to disabled, or vice versa, based on the selected system gain.

8. The method of claim 1 further comprising generating and displaying performance values adjacent a schematic depiction of the selected analog output device and AFE, the performance values generated based on the selected operating condition and performance criteria.

9. The method of claim 8 wherein the AFE is associated with an analog-to-digital converter (ADC) and the displayed performance values include at least one of input referred noise, effective number of bits, noise free resolution (NFR), and device error for the ADC.

10. The method of claim 1 further comprising receiving an indication that a user has selected a user-selectable graphical button on the GUI and, based on the indication, displaying a plurality of user-configurable registers associated with the AFE.

11. The method of claim 1 wherein selecting, via the GUI, the performance criterion includes adjusting a slider.

12. The method of claim 11 further displaying a user-configurable register, receiving an updated register value for the user-configurable register, and automatically updating the slider based on received updated register value.

13. The method of claim 1 further comprising initiating a download of register and selected sensor information over a wide area network from a server to a local system of a user.

14. The method of claim 13 further comprising loading the downloaded register and selected sensor information into software running on the user's local system.

15. A non-transitory, computer-readable storage device storing software that, when executed by a processor, causes the processor to:
receive input from a graphical user interface (GUI), the input indicating a selection of an analog output device that provides an analog output signal according to predetermined characteristics; and
load into an AFE register internal to an analog front end (AFE), an AFE configuration value to configure the AFE for conditioning the analog output signal to provide a conditioned analog signal, including
receive a selection via the GUI of an operating condition for the analog output device and AFE comprising at least one of: input signal polarity, calibration mode and diagnostics mode;
receive a selection via the GUI of a performance criterion for the analog output device and AFE comprising at least one of: sample rate and excitation current;
generate the AFE configuration value based on the received selections of the operating condition and performance criterion; and
load the AFE configuration value into the AFE register.

16. The non-transitory, computer-readable storage device of claim 15 wherein the software causes the processor to select a plurality of operating conditions and a plurality of performance criteria and provide a plurality of configuration values based on the plurality of selected operating conditions and the plurality of selected performance criteria.

17. The non-transitory, computer-readable storage device of claim 15 wherein the operating condition further comprises at least one of:
selecting a voltage reference input;
selecting between a clock generated internal to the AFE and an external clock; and
specifying a value for a general purpose input/output (GPIO) direction register;
selecting a power mode.

18. The non-transitory, computer-readable storage device of claim 15 wherein the performance criterion further comprises selecting a system gain.

19. The non-transitory, computer-readable storage device of claim 15 wherein the software causes the processor to generate a schematic depiction of the selected analog output device and AFE based on the selected operating condition and selected performance criterion.

20. The non-transitory, computer-readable storage device of claim 19 wherein the schematic depiction includes a graphic of a fixed gain amplifier (FGA) and a graphic of programmable gain amplifier (PGA), and wherein, based on a user-selectable gain setting, the software causes the processor to visually indicates whether the FGA graphic is enabled or disabled.

21. The non-transitory, computer-readable storage device of claim 15 wherein the software causes the processor to generate and display performance values adjacent a schematic depiction of the selected analog output device and AFE, the performance values generated based on the selected operating condition and performance criteria.

22. The non-transitory, computer-readable storage device of claim 21 wherein the AFE is associated with an analog-to-digital converter (ADC) and the displayed performance values include at least one of input referred noise, effective number of bits, noise free resolution (NFR), and device error for the ADC.

23. The non-transitory, computer-readable storage device of claim 15 wherein the software causes the processor to receive the performance criterion selection by way of an adjustable graphical slider.

24. The non-transitory, computer-readable storage device of claim 23 wherein the software causes the processor to display a user-configurable register, receive an updated register value for the user-configurable register, and automatically update the slider based on received updated register value.

25. A system, comprising:
storage containing software; and
a processor coupled to the storage and configured to execute the software to:
receive input from a graphical user interface (GUI), the input indicating a selection of an analog output device that provides an analog output signal according to predetermined characteristics;
load into an AFE register internal an analog front end (AFE), an AFE configuration value to configure the AFE to condition the analog output signal to provide a conditioned analog signal, including
receive a selection via the GUI of an operating condition for the analog output device and AFE comprising at least one of: input signal polarity, calibration mode and diagnostics mode;
receive a selection via the GUI of a performance criterion for the analog output device and AFE comprising at least one of: sample rate and excitation current;
generate the AFE configuration value based on the received selections of the operating condition and performance criterion; and
load the AFE configuration value into the AFE register.

26. The system of claim 25 wherein the software causes the processor to select a plurality of operating conditions and a plurality of performance criteria and provide a plurality of configuration values based on the plurality of selected operating conditions and the plurality of selected performance criteria.

27. The system of claim 25 wherein the operating condition further comprises at least one of:
selecting a voltage reference input;
selecting between a clock generated internal to the AFE and an external clock; and
specifying a value for a general purpose input/output (GPIO) direction register;
selecting a power mode.

28. The system of claim 25 wherein the performance criterion further comprises selecting a system gain.

29. The system of claim 25 wherein the software causes the processor to generate a schematic depiction of the selected analog output device and AFE based on the selected operating condition and selected performance criterion.

30. The system of claim 29 wherein the schematic depiction includes a graphic of a fixed gain amplifier (FGA) and a graphic of programmable gain amplifier (PGA), and wherein, based on a user-selectable gain setting, the software causes the processor to visually indicates whether the FGA graphic is enabled or disabled.

31. The system of claim 25 wherein the software causes the processor to generate and display performance values adjacent a schematic depiction of the selected analog output device and AFE, the performance values generated based on the selected operating condition and performance criteria.

32. The non-transitory, computer-readable storage device of claim 31 wherein the AFE is associated with an analog-to-digital converter (ADC) and the displayed performance values include at least one of input referred noise, effective number of bits, noise free resolution (NFR), and device error for the ADC.

33. The system of claim 25 wherein the software causes the processor to receive the performance criterion selection by way of an adjustable graphical slider.

34. The system of claim 33 wherein the software causes the processor to display a user-configurable register, receive an updated register value for the user-configurable register, and automatically update the slider based on received updated register value.

* * * * *